(12) United States Patent
Ross et al.

(10) Patent No.: US 7,006,289 B2
(45) Date of Patent: Feb. 28, 2006

(54) MAGNETOOPTICAL ISOLATOR MATERIAL

(75) Inventors: Caroline A. Ross, Boston, MA (US); Tamar Tepper, Haifa (IL); Ytshak Avrahami, Arlington, MA (US)

(73) Assignee: Massachuesetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/655,378

(22) Filed: Sep. 4, 2003

(65) Prior Publication Data
US 2004/0114233 A1 Jun. 17, 2004

Related U.S. Application Data

(60) Provisional application No. 60/408,202, filed on Sep. 4, 2002, provisional application No. 60/445,550, filed on Feb. 6, 2003.

(51) Int. Cl.
G02B 27/28 (2006.01)
G02B 5/30 (2006.01)
(52) U.S. Cl. .................. 359/500; 359/494; 385/11
(58) Field of Classification Search ............ 359/483, 359/484, 494, 500; 385/11
See application file for complete search history.

(56) References Cited

U.S. PATENT DOCUMENTS

| 4,728,178 | A | * | 3/1988 | Gualtieri et al. ............ 359/282 |
| 5,598,492 | A | | 1/1997 | Hammer |
| 5,801,875 | A | * | 9/1998 | Brandle et al. ............. 359/321 |
| 5,997,704 | A | * | 12/1999 | Shiono et al. ......... 204/298.12 |

FOREIGN PATENT DOCUMENTS

| GB | 1 504 985 | | 3/1978 |
| JP | 63070506 A | * | 3/1988 |
| WO | WO 95/16061 | | 6/1995 |

OTHER PUBLICATIONS

J.Fujita, et. al., "Hybrid integrated optical isolaors and circulators", Proceedings of SPIE, vol. 4652, pp. 77-85 (Jun. 2002).*
"Magneto-Optic Faraday Rotation of Sputtered $\gamma$-$Fe_2O_3$ Film," Wang et al. *Journal of Magnetism and Magnetic Materials*. 1988. vol. 73.
"Pulsed Laser Deposition of Iron Oxide Films," Tepper et al. *Journal of Applied Physics*. Apr. 2002. vol. 91, No. 7.
"Magnetic and Magneto-Optic Properties of Orthoferrite Thin Films Grown by Pulsed-Laser Deposition," Schmool et al. *Journal of Applied Physics*. Nov. 1999. vol. 86, No. 10.
"Ferroelectricity and Ferrimagnetism in Iron-doped $BsTiO_3$." Maier et al. *Applied Physics Letters*. Apr. 2001. vol. 78, No. 17.
"Integrated optical isolator and circulator using nonreciprocal phase shifters: a proposal," Okamura et al. *Applied Optics*. Jun. 1984. vol. 23, No. 11.
"Magneto-optical properties of iron oxide films," Tepper et al. *Journal of Applied Physics*. May 2003. vol. 93, No. 10.

* cited by examiner

*Primary Examiner*—Leonidas Boutsikaris
(74) *Attorney, Agent, or Firm*—Gauthier & Connors LLP

(57) ABSTRACT

An optical isolator is provided. The optical isolator includes a substrate and a thin film is formed comprising of iron oxide or magnetic persovskite-type material having a high Faraday rotation.

21 Claims, 8 Drawing Sheets

FBT-1008 (Fe-50, BTO)

MAGNETOOPTICAL ISOLATOR MATERIAL

PRIORITY INFORMATION

This application claims priority from provisional application Ser. No. 60/408,202 filed on Sep. 4, 2002 and provisional application Ser. No. 60/445,550 filed on Feb. 6, 2003, both of which are incorporated herein by reference in their entireties.

BACKGROUND OF THE INVENTION

The invention relates to the field of optical isolators, and in particular to using iron oxide and perovskite materials to form optical isolators.

An isolator is a device that allows polarized light to pass through in one direction, but not in the opposite direction (like a one-way valve). These are useful in photonic applications. An isolator is placed at the outlet of a laser, allowing the light to leave the laser, but not to reenter it, which would make the laser unstable. An isolator typically consists of a pair of polarizers, with their principal axes oriented at 45°, placed around a magnetooptical crystal. The crystal rotates the plane of polarization of light passing through it: this property is called Faraday rotation. The crystal is thick enough that it rotates the plane of polarization of the light by exactly 45°, and the light can therefore pass through the second polarizer. However, if light is propagating towards the laser, it is blocked by the first polarizer and cannot pass.

For optical communications, which operate at a laser wavelength of 1550 nm, isolators are made from a bismuth-substituted yttrium iron garnet material (Bi—YIG) which has a high Faraday rotation of up to about 6° per micron, depending on the Bi content. This means that the isolator crystal needs to be 45/6=7.5 microns long. Isolators are made as discrete devices by growing crystals of Bi—YIG by liquid-phase epitaxy on other garnet substrates, then cutting them into the correct shape and mounting them between polarizers.

Recently, however, there has been interest in making integrated photonic devices in which the isolator is formed as a component on a chip, integrated with the other components (lasers, waveguides, etc.). For an integrated optical device, it is important to note that there are various designs of isolators other than that discussed herein, for instance devices based on Mach-Zehnder interferometers. These other designs have the advantage that they do not require separate polarizers and analyzers, making them more suitable for integration. Additionally, they can work successfully using magnetooptical materials with relatively modest values of Faraday rotation, e.g. less than 0.1°/micron.

For making an integrated isolator, the following properties are the most important: the material must have a Faraday rotation, but it can be modest, in the range of ~0.01°/micron or greater. The material must have a high degree of transparency at the relevant wavelength (1550 nm). In addition, the material must be compatible with a substrate, such as GaAs or Si.

Bi-YIG satisfies the first two criteria, but not the third. It is hard to grow as a film on a substrate other than garnet, so if it is grown on Si or GaAs it does not have the required magnetooptical properties. There is therefore interest in finding alternative materials with high Faraday rotation that can be integrated on Si or GaAs substrates.

SUMMARY OF THE INVENTION

According to one aspect of the invention, there is provided an optical isolator. The optical isolator includes a substrate and a thin film is formed comprising iron oxide or magnetic persovskite-type material having a high Faraday rotation.

According to another aspect of the invention, there is provided an optical structure having high Faraday rotation. The optical structure includes a substrate and a thin film is formed comprising iron oxide or magnetic persovskite-type material having a high Faraday rotation.

According to another aspect of the invention, there is provided a method of forming an optical isolator. The method includes providing a substrate, and forming a thin film comprising iron oxide or magnetic persovskite-type material having high Faraday rotation.

DETAILED DESCRIPTION OF THE INVENTION

Figure 1A:
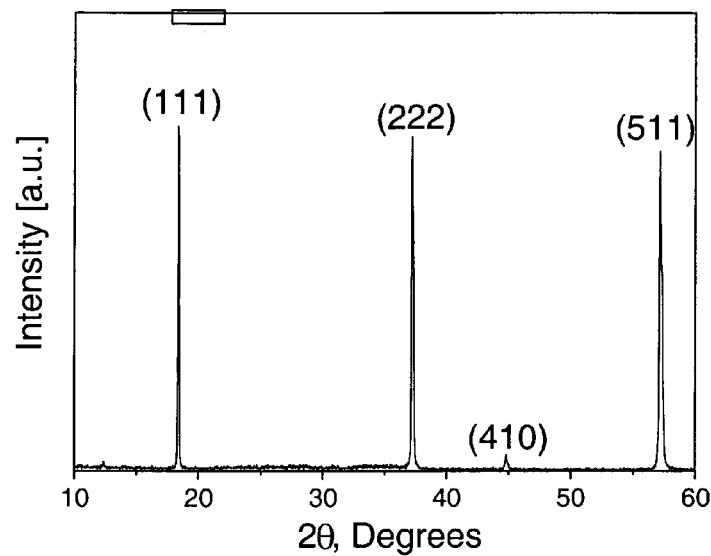
FIG. 1A is an xray diffraction (XRD) spectrum of a 420 nm maghemite ($\gamma$-$Fe_2O_3$) film deposited on an oxidized Si (001) substrate.

The most extensively studied materials for magnetooptical applications in the visible and infrared are the garnet group, mainly bismuth-substituted iron garnets. Fully-substituted bismuth iron garnet ($Bi_3Fe_5O_{12}$) exhibits a Faraday rotation as high as 7.8 deg/$\mu$m at 633 nm and an absorption coefficient of 3484 $cm^{-1}$ at this wavelength. Partially-substituted bismuth iron garnets such as $Y_{1.43}$ $Yb_{0.82}$ $Bi_{0.75}$ $Fe_5O_{12}$ exhibit a rotation of 0.0934 deg/$\mu$m and an absorption coefficient of 1.6 $cm^{-1}$ at 1550 nm. However, good quality garnet films are usually grown using liquid phase epitaxy onto garnet substrates, which is an undesirable process in terms of device integration. Therefore, it is attractive to explore the magnetooptical properties of other magnetic oxides that have more easily integrated fabrication processes.

Iron oxide can exhibit several crystal structures and compositions, including wustite (FeO), magnetite ($Fe_3O_4$), maghemite ($\gamma$-$Fe_2O_3$) and hematite ($\alpha$-$Fe_2O_3$). Maghemite is of particular interest because of its applications in magnetic recording media. It has a cubic spinel structure and is known to be ferrimagnetic with a saturation magnetization of 390 kA/m. Maghemite is a metastable phase at ambient conditions, and tends to transform to a stable phase, antiferromagnetic hematite ($\alpha$-$Fe_2O_3$), when heated up to 400° C. It is therefore of interest to explore the deposition and magnetic behavior of ferrimagnetic maghemite films to be used in the forming of isolators.

Very little is known about the magnetooptical properties of pure iron oxides. The Faraday rotation for sputtered maghemite films at 633 nm is about 0.15 deg/$\mu$m, and its absorption coefficient at this wavelength is estimated to be 3500 $cm^{-1}$. To measure the magnetooptical properties, iron oxide films have been grown onto single crystal MgO and oxidized silicon substrates using pulsed laser deposition (PLD).

PLD of iron oxide films is performed by ablating a $\alpha$-$Fe_2O_3$ target in vacuum using a KrF excimer laser of wavelength 248 nm, operated at 50 Hz and 400 mJ per pulse (the laser fluency at the target is about 1.45 $J/cm^2$). Films are grown onto oxidized Si (001) (with about 5 nm of native oxide) and double side polished MgO (001) substrates at base pressures in the range of $10^{-4}$ Pa. The laser beam is scanned over an area of 5×5 $mm^2$ on the target surface to reduce particulate formation, and the substrate-target spacing is 6.5 cm. The substrates are held at 500° C. during deposition, and some of the films are held at 500° C. after the deposition ended.

The structure of the films is examined by x-ray diffraction (XRD), in the conventional symmetric $\theta$–$2\theta$ geometry. The thickness and roughness of the films are determined by profilometry. The chemical composition of the films deposited on Si is characterized by wavelength dispersive spectroscopy (WDS). Alternating gradient (AGM) and vibrating sample magnetometry (VSM) are used to measure hysteresis loops, with applied fields of up to 1 T. The Faraday rotation of the films deposited on MgO is characterized at 645 nm and 1550 nm wavelengths, in the direction normal to the film plane.

Figure 1B:
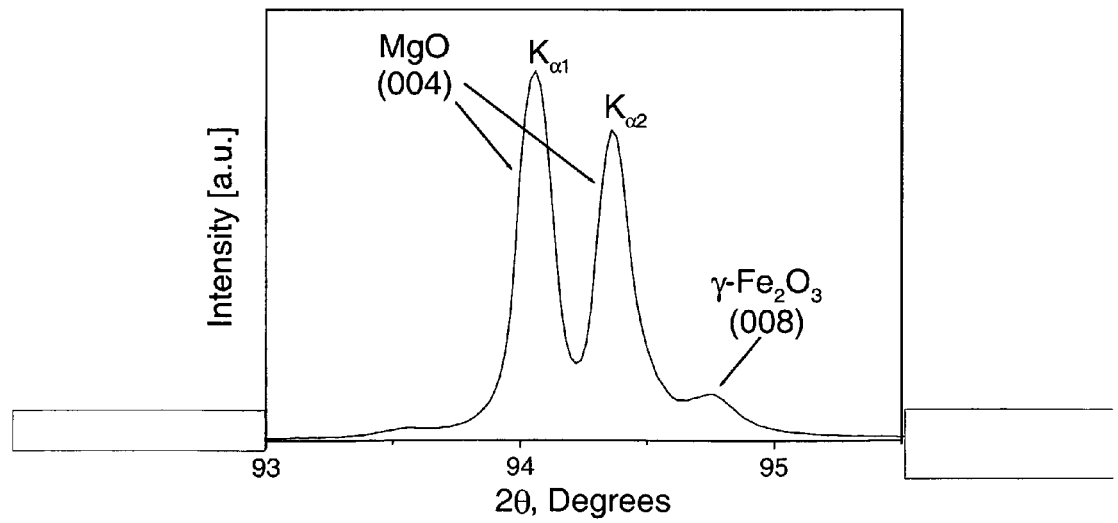
FIG. 1B is an XRD spectrum of a 420 nm maghemite film deposited on a MgO substrate.

The deposition rates on MgO and on Si substrates in vacuum are similar, with the films grown on MgO substrates having slightly lower deposition rates. The average deposition rate is 0.41±0.03 nm/sec. The average roughness is around 2 nm for film thickness in the range of 140–420 nm. XRD showed only the presence of the $\gamma$-$Fe_2O_3$ phase, even after post-deposition annealing at 500° C. for 30 minutes. The crystalline orientation of the films depended on the type of substrate. Films grown on oxidized Si (001) substrates, as shown in FIG. 1A, are polycrystalline, with a (111) preferred growth orientation, while films deposited on MgO (001) showed cube-on-cube epitaxial growth, as shown in FIG. 1B.

Figure 2A:
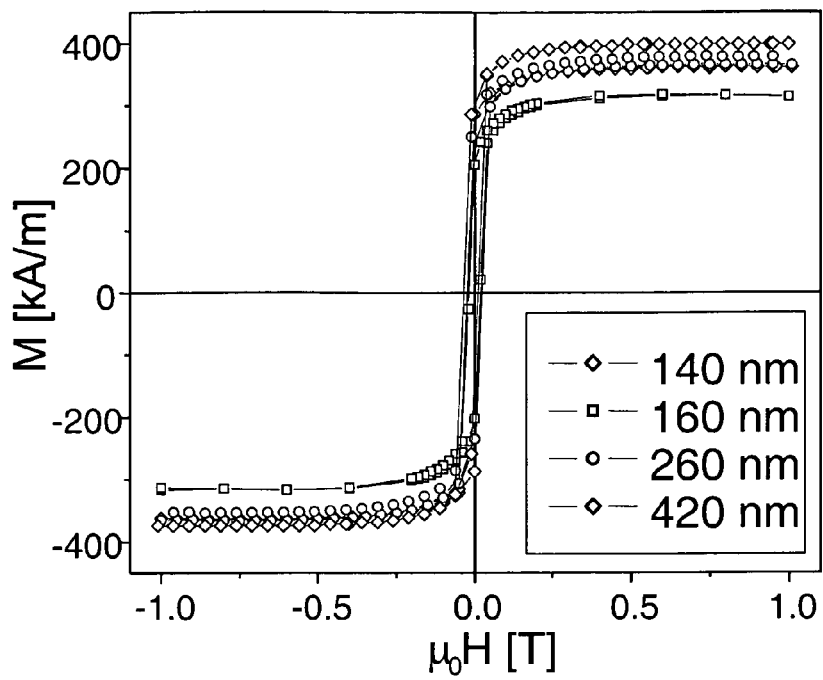
FIGS. 2A–2B are an in-plane and out-of-plane VSM hysteresis loops of $\gamma$-$Fe_2O_3$ films with different thickness deposited on MgO substrates.
Figure 2B:
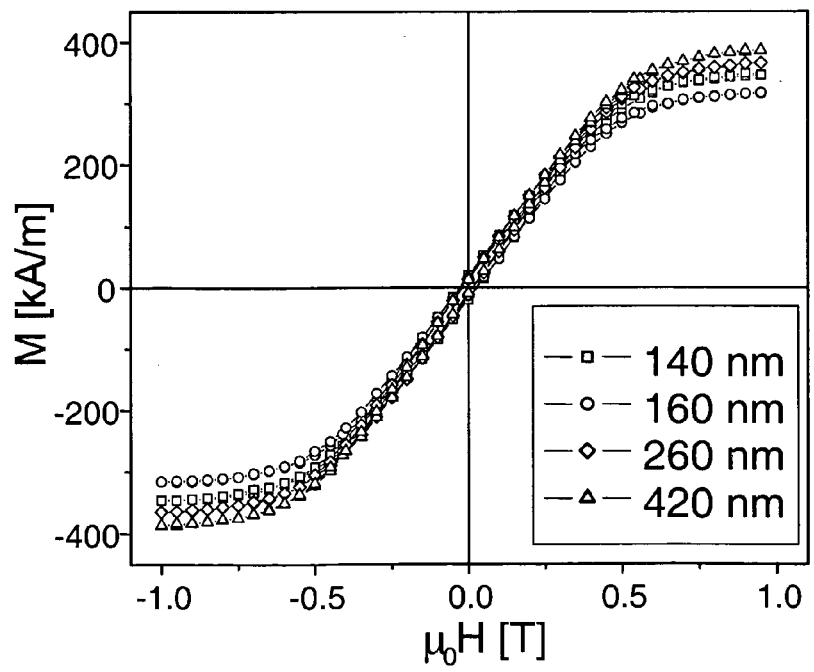

Hysteresis measurements showed that all films had an in-plane magnetization. Films deposited on Si showed an increase of saturation magnetization $M_S$ with the film thickness, from 408±8 kA/m for 150 nm films to 510±10 kA/m for 405 nm films. Films deposited on MgO showed an average saturation magnetization of 353±26 kA/m, with no clear correlation to film thickness. FIG. 2A shows the in-plane and FIG. 2B shows the out-of-plane hysteresis loops of these films on MgO substrates. WDS measurements of films deposited on Si showed that the iron content in these films increased with film thickness. The 150 nm films have 40.5±0.1% Fe, close to stoichiometric, and 405 nm films had 45.0±0.1% Fe, showing oxygen deficiency. It is assumed that the increase in iron content is responsible for the increase in saturation moment above the bulk maghemite value of 390 kA/m for films deposited on silicon. Films on MgO, however, have a saturation moment similar to bulk maghemite and are expected to be close to stoichiometric.

Figure 3A:
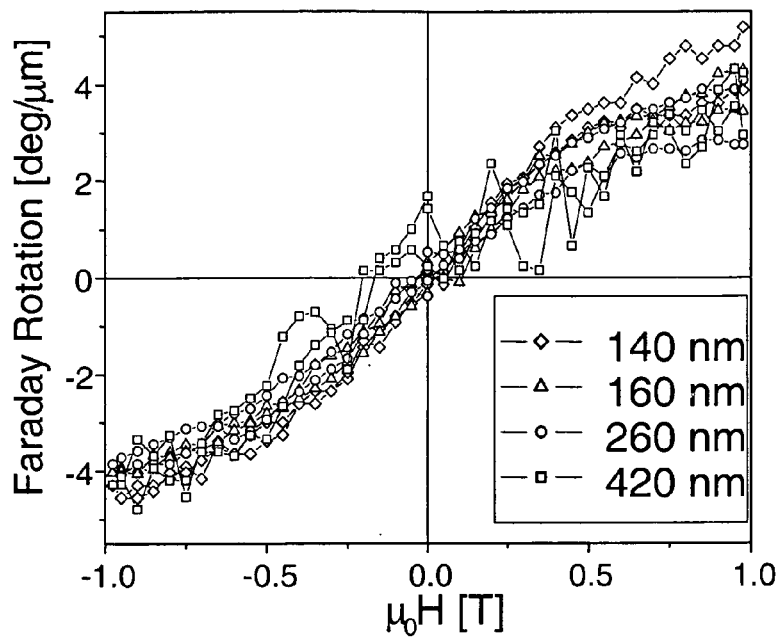
FIGS. 3A–3B are Faraday rotation measurements of $\gamma$-$Fe_2O_3$ films deposited on MgO substrates with different thicknesses measured at two different wavelengths.
Figure 3B:
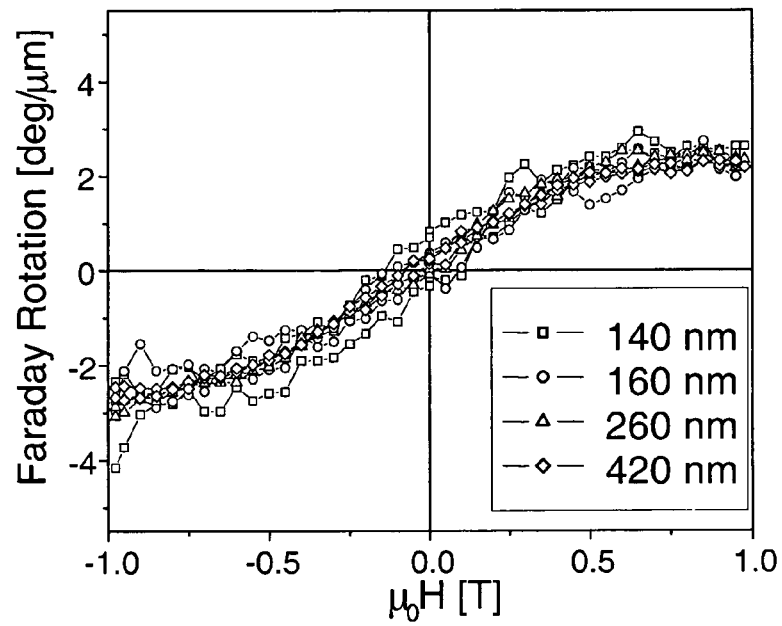

FIGS. 3A–3B show the Faraday rotation measurements of iron oxide films on MgO substrates at 645 nm and 1550 nm. The saturation value of the Faraday rotation is consistent over a large range of film thickness, and is estimated to be 4 deg/$\mu$m at 645 nm, as shown in FIG. 3A, and 2.5 deg/$\mu$m at 1550 nm, as shown in FIG. 3B. The absorption coefficients of these films are estimated by measuring the light transmitted through the film, and are found to be 5.8±0.8 $\mu m^{-1}$ at 645 nm and 5.2±0.3 $\mu m^{-1}$ at 1550 nm.

The Faraday data, as shown in FIGS. 3A–3B, show similar loop shapes and saturation fields as the VSM hysteresis loops measured with an out-of-plane field, FIG. 2B. The out-of-plane saturation field is about 0.55 T for both VSM and Faraday loops, for a range of film thicknesses. The Faraday rotation is about 30 times higher than the value reported in the past for sputtered $\gamma$-$Fe_2O_3$ films. It is also higher than the Faraday rotation of vacancy-defective Mn-ferrite, $Mn_{1.18}Fe_{1.82}O_{4+d}$, which had a Faraday rotation of about −0.3 deg/$\mu$m at 645 nm. The absorption coefficient of this ferrite material at 645 nm is found to be about 2.5 $\mu m^{-1}$, similar in magnitude to the results obtained here.

Faraday rotation is a result of the Zeeman splitting that occurs in a resonant transition in the presence of a magnetic field. When the absorption peak of such a transition splits, due to the different spins of the electrons involved, the corresponding refractive indices of left- and right-circularly polarized light also diverge. The Faraday rotation is proportional to the difference in these indices (or velocities), and it will clearly be larger as the measurement wavelength approaches that of the resonant transition, and this is associated with an increase in the optical absorption.

In the case of maghemite, the resonant transitions due to the 3 d $Fe^{3+}$ electrons that cause the Faraday rotation are at UV wavelengths, around 4.3 eV (289 nm), so the measurements performed here (visible and IR) are at longer wavelengths than the resonant wavelength. However, these films also contain some $Fe^{2+}$, due to their non-stoichiometry, and $Fe^{2+}$ in octahedral sites is known to exhibit a transition at 2.0 eV (622 nm). It is assumed that the high Faraday rotation measured in these samples, accompanied by a relatively high absorption, is associated with a transition of these octahedrally coordinated $Fe^{2+}$ ions. Based on these considerations, it should be possible to tailor the absorption and Faraday rotation of the iron oxide by modifying the oxidation state of the ions in the films, for instance by adding small amounts of oxygen during film deposition or by doping the films with other cations, which have resonant transitions at lower wavelengths. Dopants can also shift the magnetic balance between the sublattices, which may cause increased Faraday rotation. Such modifications of the iron oxide structure, including use of the similar magnetite ($Fe_3O_4$) structure, allow these films to be used in the same way as garnet films. The films grow well on MgO, which can also be grown on Si. This makes them suitable for integration.

In addition to maghemite structures described herein, the invention uses perovskite-structured materials as candidates for use in forming an isolator device. Perovskites have the structure $ABO_3$, where A and B are metal ions, e.g. Ba and Ti. If the A and B ions are non-magnetic, then these materials are not magnetooptically active but they can be doped with magnetic ions, such as Fe, Co or Ni ions to make them magnetic. Two examples of such materials are described. Other materials based on the same perovskite structure may be included in the disclosure. The perovskites grow well on MgO, which can also be grown on Si. This makes them suitable for integration.

Figure 4A:
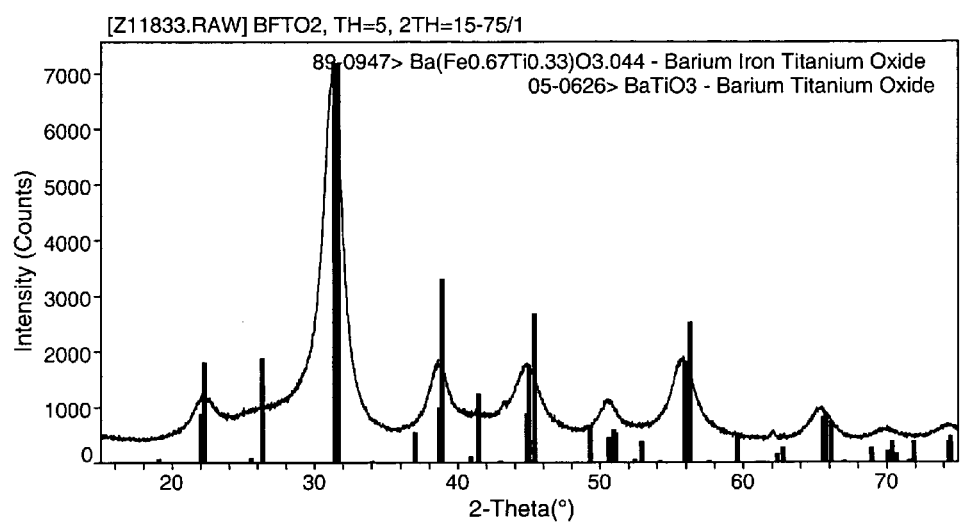
FIGS. 4A–4D are XRD, optical transmission, magnetic hysteresis, and magnetooptical results for a perovskite-type material $Ba(Ti_{0.5}Fe_{0.5})O_3$.
Figure 4B:
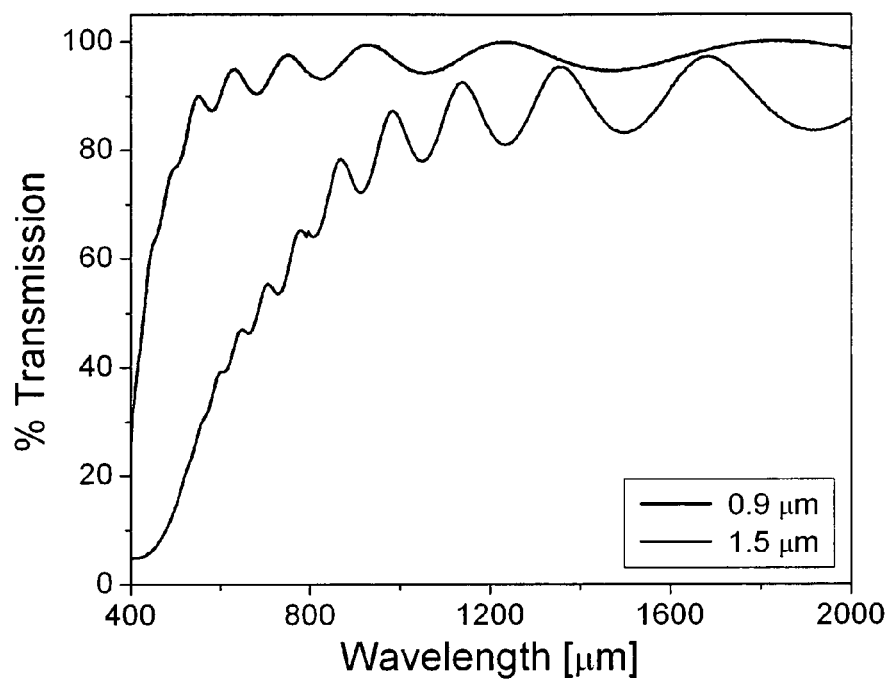
Figure 4C:
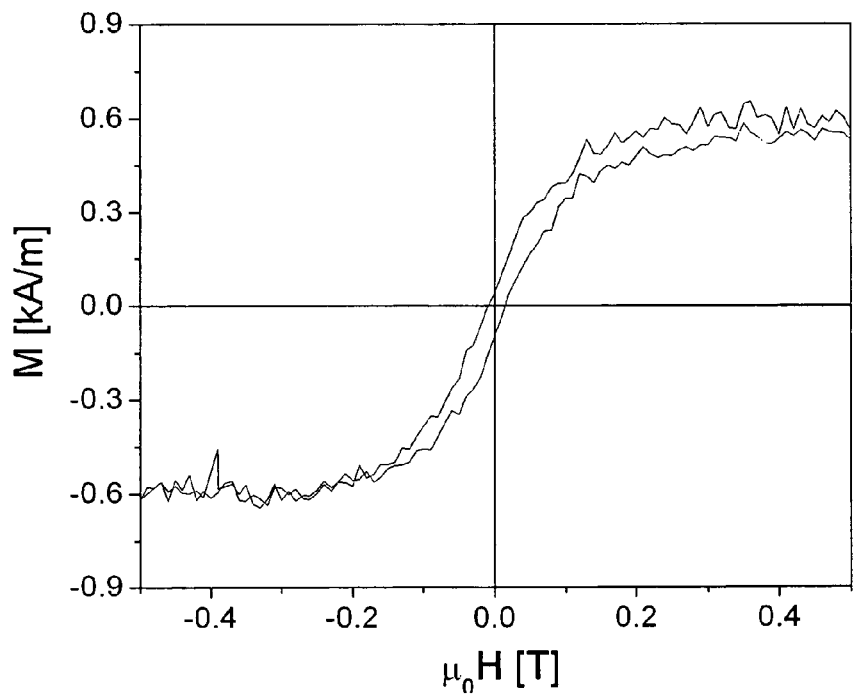
Figure 4D:
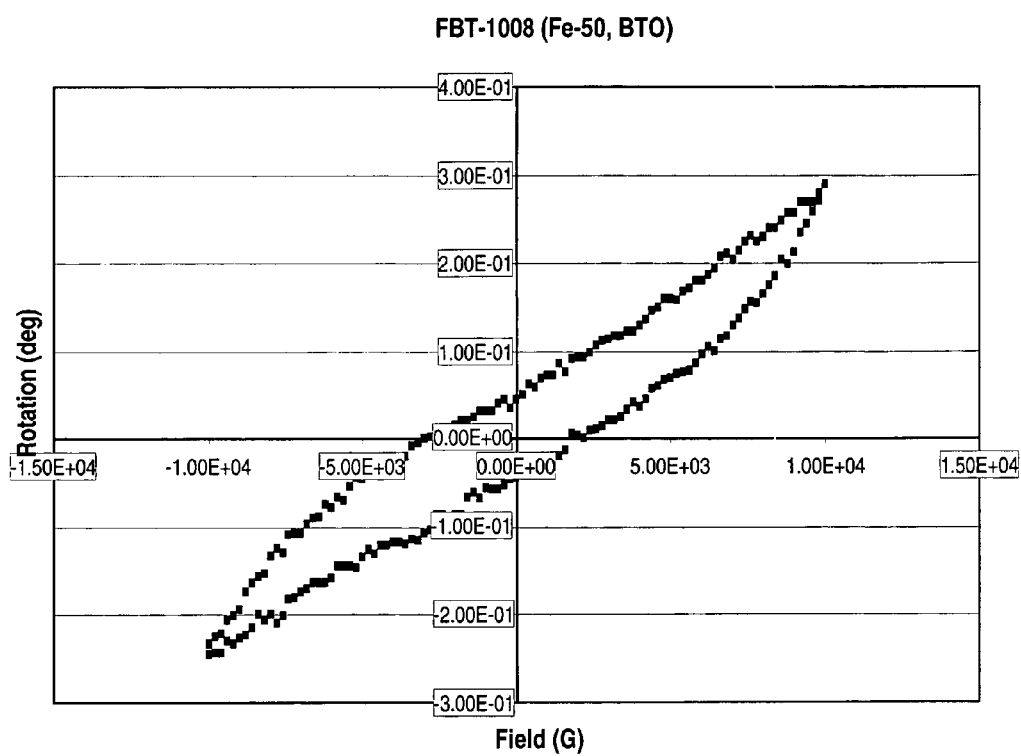

An example of a perovskite-type material is Ba$(Ti_{0.5}Fe_{0.5})$ $O_3$ or BFTO. Films of BFTO are formed using pulsed laser deposition. The BFTO films, according to XRD, have the perovskite structure, as shown in FIG. 4A. FIG. 4B shows the optical transmission of BFTO films having two different thicknesses. Note the oscillations are due to reflection and are an artifact of the measurement. These films show excellent transmission of light at 1550 nm wavelength. FIG. 4C shows the magnetic hysteresis of BFTO films, which demonstrate a ferromagnetic signal. This shows that the addition of Fe made the material magnetic. FIG. 4D shows the measured Faraday rotation of the Fe-doped perovskite, $Ba(FeTi)O_3$, which is about 0.5 micron thick. Therefore, BFTO has a faraday rotation of up to about 0.6 degrees per micron, which proves that BFTO is magnetooptical as well as just being magnetic.

Figure 5A:
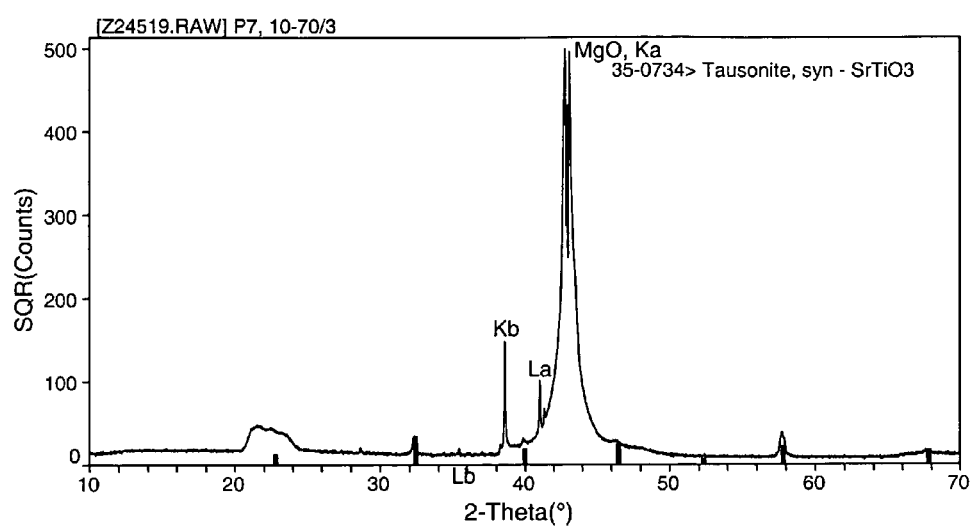
FIGS. 5A–5C are XRD, optical transmission and magnetic hysteresis results for a perovskite-type material $Sr(Ti_{0.65}Fe_{0.35})O_3$.
Figure 5B:
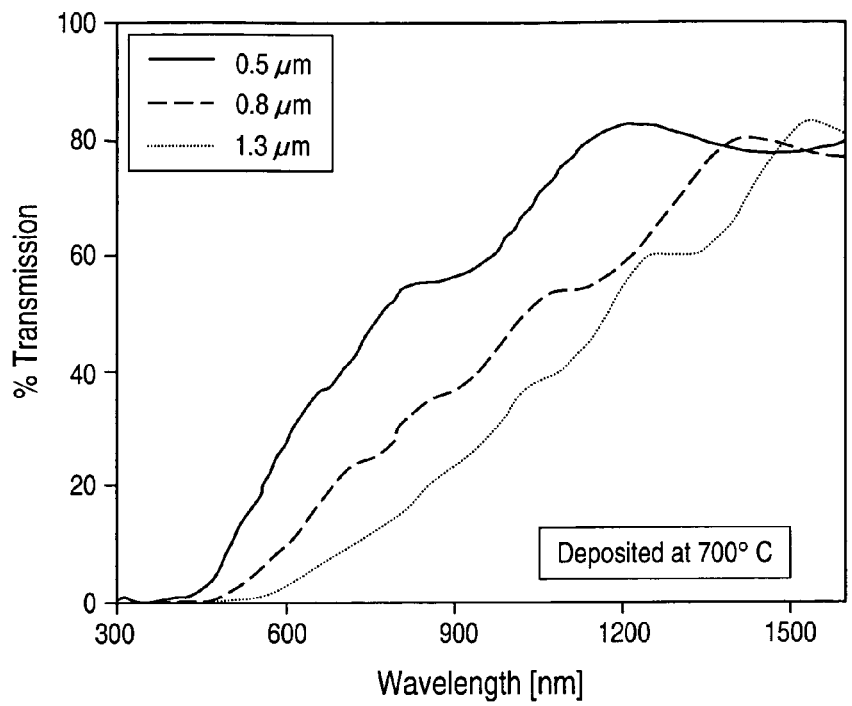
Figure 5C:
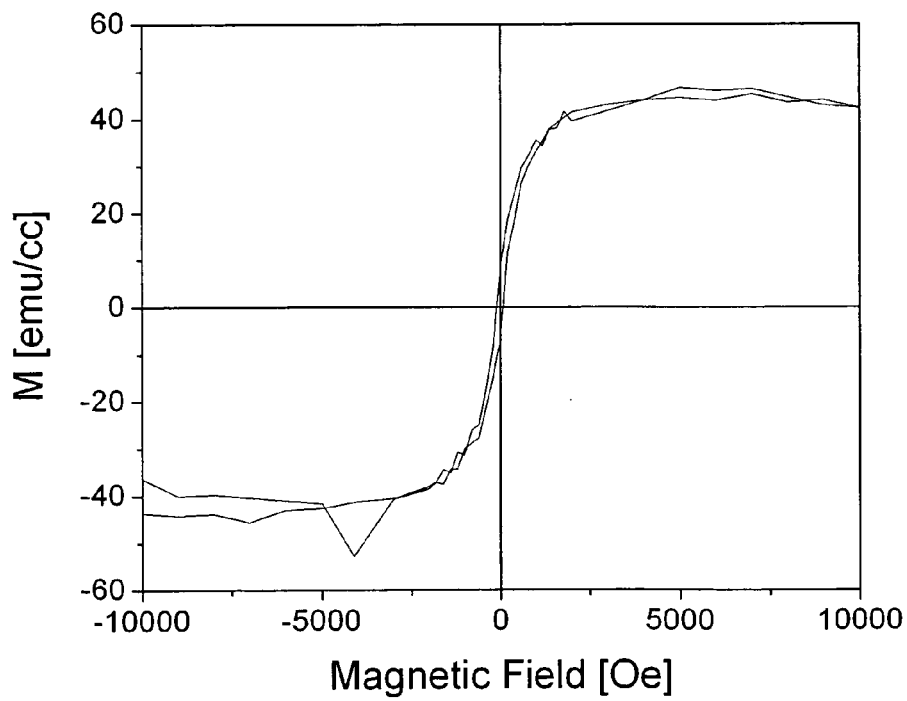

Another example of a perovskite-type material is $Sr(Ti_{0.65}Fe_{0.35})O_3$ or SFTO. The SFTO films are also deposited using pulsed laser deposition. The films have the perovskite structure, according to x-ray diffraction, as shown in FIG. 5A. FIG. 5B shows the optical transmission of SFTO films having two different thicknesses. Note the oscillations are due to reflection and are an artifact of the measurement. The films are highly transmissive at 1550 nm wavelength. FIG. 5C shows the magnetic hysteresis of SFTO films, which demonstrate a higher saturation moment of ~50emu/cc (1 memu/cc=1 kA/m), indicating that doping with Fe made the films magnetic.

Therefore, these two types of structures can be used to form an isolator. Other doped perovskite structures can also be used to make an isolator, including materials where the A or B atoms are partly or fully replaced by magnetic ions such as Ni, Co or Fe or other magnetic transition metal ions. An example of a fully-substituted perovskite is a material such as $BiFeO_3$ or $CeFeO_3$ (also called orthoferrites). Moreover, films can be grown by other deposition methods such as sputtering, evaporation or chemical vapor deposition, in addition to PLD. For integration of the materials into silicon-based devices, intermediate layers such as MgO can be included under the magnetooptical material to improve the crystal structure and properties.

Although the present invention has been shown and described with respect to several preferred embodiments thereof, various changes, omissions and additions to the form and detail thereof, may be made therein, without departing from the spirit and scope of the invention.

What is claimed is:

1. An optical isolator comprising:
   a substrate; and
   a thin film is formed by depositing on said substrate a magnetic perovskite material having a high Faraday rotation between 640 nm and 1550 nm.

2. The optical isolator of claim 1, wherein said substrate comprises Si.

3. The optical isolator of claim 1, wherein said substrate comprises MgO.

4. The optical isolator of claim 1, wherein said perovskite material comprises $(Ba(Ti_{0.5}Fe_{0.5})O_3)/(BFTO)$.

5. The optical isolator of claim 1, wherein said perovskite material comprises $Sr(Ti_{0.65}Fe_{0.35})O_3/(SFTO)$.

6. The optical isolator of claim 1, wherein said perovskite material is formed by ablating an oxide target using a KrF excimer laser of wavelength 248 nm.

7. An optical structure having high Faraday rotation comprising:
   a substrate; and
   a thin film is formed by depositing on said substrate a magnetic perovskite material having a high Faraday rotation between 640 nm and 1550 nm.

8. The optical structure of claim 7, wherein said substrate comprises Si.

9. The optical structure of claim 7, wherein said substrate comprises MgO.

10. The optical structure of claim 7, wherein said perovskite material comprises $(Ba(Ti_{0.5}Fe_{0.5})O_3)/(BFTO)$.

11. The optical structure of claim 7, wherein said perovskite material comprises $Sr(Ti_{0.65}Fe_{0.35})O_3/(SFTO)$.

12. The optical structure of claim 7, wherein said perovskite material is formed by ablating an oxide target using a KrF excimer laser of wavelength 248 nm.

13. A method of forming an optical isolator comprising:
    providing a substrate; and
    forming a thin film by depositing on said substrate a magnetic perovskite material having a high Faraday rotation between 640 nm and 1550 nm.

14. The method of claim 13, wherein said substrate comprises Si.

15. The method of claim 13, wherein said substrate comprises MgO.

16. The method of claim 13, wherein said perovskite material comprises $(Ba(Ti_{0.5}Fe_{0.5})O_3)/(BFTO)$.

17. The method of claim 13, wherein said perovskite material comprises $Sr(Ti_{0.65}Fe_{0.35})O_3/(SFTO)$.

18. The method of claim 13, wherein perovskite material is formed by ablating an oxide target using a KrF excimer laser of wavelength 248 nm.

19. The optical isolator of claim 1 further comprising intermediate layers of MgO that are formed between said substrate and said thin film.

20. The optical structure of claim 7 further comprising intermediate layers of MgO that are formed between said substrate and said thin film.

21. The method of claim 13 further comprising intermediate layers of MgO that are formed between said substrate and said thin film.

* * * * *